US009201757B2

(12) United States Patent
Menghrajani et al.

(10) Patent No.: US 9,201,757 B2
(45) Date of Patent: Dec. 1, 2015

(54) OFFLINE TYPE CHECKING IN PROGRAMMING LANGUAGES

(71) Applicant: Facebook, Inc., Menlo Park, CA (US)

(72) Inventors: Alok Menghrajani, San Francisco, CA (US); Julien Verlaguet, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 435 days.

(21) Appl. No.: 13/671,049

(22) Filed: Nov. 7, 2012

(65) Prior Publication Data

US 2014/0130016 A1    May 8, 2014

(51) Int. Cl.
  G06F 9/44    (2006.01)
  G06F 11/36   (2006.01)
  G06F 9/45    (2006.01)

(52) U.S. Cl.
  CPC ............ *G06F 11/3604* (2013.01); *G06F 8/437* (2013.01)

(58) Field of Classification Search
  CPC .. G06F 11/36; G06F 11/3604; G06F 11/3608
  USPC .................................................. 717/124–126
  See application file for complete search history.

(56) References Cited

U.S. PATENT DOCUMENTS

| | | | | |
|---|---|---|---|---|
| 5,313,616 A * | 5/1994 | Cline et al. ..................... | | 717/127 |
| 2002/0112201 A1 * | 8/2002 | Flanagan ............ | G06F 11/3608 | 714/42 |
| 2006/0075387 A1 * | 4/2006 | Martin ...................... | G06F 8/34 | 717/124 |
| 2008/0082968 A1 * | 4/2008 | Chang ................. | G06F 11/3688 | 717/128 |
| 2008/0235675 A1 * | 9/2008 | Chen ...................... | G06F 8/437 | 717/147 |
| 2010/0169868 A1 * | 7/2010 | Condit .................... | G06F 8/437 | 717/136 |
| 2011/0296386 A1 * | 12/2011 | Woollen .................... | G06F 8/70 | 717/124 |

OTHER PUBLICATIONS

"c#—Definition of a Method Signature," Stack Overflow, Dec. 15, 2011, last retrieved from http://stackoverflow.com/questions/8516498/definition-of-a-method-signature on Mar. 6, 2015.*
"Chapter 2: Understanding class definitions," bluej.org, Feb. 3, 2006, last retrieved from http://www.bluej.org/objects-first/chapters/objects-first-ch2.pdf on Mar. 6, 2015.*
Evans, David, et al., "LCLint: A Tool for Using Specifications to Check Code," 1994.*
Flanagan, Cormac, et al., "Extended Static Checking for Java," Compac Systems Research Center, 2002.*

(Continued)

*Primary Examiner* — Wei Zhen
*Assistant Examiner* — Andrew M Lyons
(74) *Attorney, Agent, or Firm* — Perkins Coie LLP (57) ABSTRACT

Disclosed is a method and system for detecting errors in source code of an application without executing the source code. Embodiments of the disclosed technique include detecting an error generating change at a specific location in source code of an application without executing the source code. The detection includes detecting an error in the changed portion of the source code as well dependencies of the changed portion of the source code. After the error detection, an error message containing information of the error is generated and stored in a storage unit. The information on the error includes (a) an indication of the change in source code, (b) the specific location, or (c) reason for the error. The types of error detected can include (i) a data type mismatch error, (ii) a syntax error, and (iii) other errors such as uninitialized variable access, null value or pointer dereference.

21 Claims, 7 Drawing Sheets

(56) References Cited

OTHER PUBLICATIONS

"GNU Flymake—an on-the-fly syntax checker for GNU Emacs," Aug. 15, 2003, last retrieved from http://flymake.sourceforge.net on Mar. 6, 2015.*

Gould, Carl et al., "JDBC Checker: A Static Analysis Tool for SQL / JDBC Applications," ICSE, 2004.*

"Is there a static analyzer [like Lint] for PHP files?," StackOverflow, Dec. 18, 2008, last retrieved from http://stackoverflow.com/questions/378959/is-there-a-static-code-analyzer-like-lint-for-php-files on Mar. 7, 2015.*

"Lint Source Code Checker," Chapter 4, Feb. 1, 2001, last retrieved from http://docs.oracle.com/cd/E19422-01/819-3688/lint.html on Mar. 6, 2015.*

\* cited by examiner

FIGURE 1

EXAMPLE SOURCE CODE OF DYNAMICALLY TYPED LANGUAGE

```
< ?php
205    public Class Greeting{public var $greeting="Hi !"} public Class Foo    { private $has_girl_friend = false;

function get_greeting () :  Greeting { return new Greeting () ;
210    }
       public function say_hello(string $name, int $age) :   string {

$x = get_greeting() ;
           return $x->greeting.$name. ".".You are ".$age. " years old.";
       }
       }
```

OFFLINE TYPE CHECKING IN PROGRAMMING LANGUAGES

FIELD OF INVENTION

This invention generally relates to error detection in computer programming languages. More specifically, the invention relates to an offline type checking in programming languages.

BACKGROUND

In computer related technologies, software validation can be stated as the process of validating and verifying that a software program/application/product meets particular requirements that guided its design and development, works as expected, or satisfies the needs of stakeholders. A primary purpose of software validation is to detect software failures so that defects may be discovered and corrected. The scope of software testing often includes examination of code as well as execution of that code in various environments and conditions. Information derived from software testing may be used to correct the software or even the process by which software is developed.

The code may contain errors such as syntax errors, semantic errors, runtime errors, data type mismatch errors, etc. The process of verifying the constraints of types such as, for example, data types is referred to as type checking. The programming languages, used to write code, may be statically type checked or dynamically type checked. A programming language is said to be statically type checked when type checking is performed during compile time. Examples of statically type checked programming languages include Java, C, C++, etc. A programming language is said to be dynamically type checked when type checking is performed during runtime. Examples of dynamically type checked programming languages include PHP, JavaScript, Ruby, Python, etc.

In programs written using dynamically type checked programming languages such as PHP, errors may not be discovered until the program code is executed. Typically, implementations of dynamically typed languages do not support checking for errors without executing the code. So, the developer is not guaranteed of proper execution of the program until the program is executed. Also, when the program executes, it may be possible that all possible scenarios, use cases, or conditions have not occurred during the execution of the program. Accordingly, there is scope for errors to remain undetected. Further, in scenarios where an application has millions of lines of source code, error detection process becomes a resource intensive task if the code has to be executed every time a small change is introduced to the code. Further, even if the application is written using statically typed programming language, detecting errors in code having millions of lines of code can take a significant amount of time.

Also, since dynamic type checking may result in errors that are discovered at runtime, such errors may occur long after the place where the programming mistake was made, that is, the place where the wrong type of data passed into a place it should not have. This may make the bug difficult to locate.

SUMMARY

What is described is a method and system for detecting errors in a source code of an application without executing the source code. Embodiments of the invention include (i) detecting, by a computer in a computer system, an error generating change at a specific location in source code of an application, the detection occurring without executing the source code; (ii) generating, by the computer, an error message containing information about source of the error, the error message including at least one of (a) an indication of the change in source code, (b) the specific location, (c) reason for the error, or (d) a potential solution to resolve the error; and (iii) storing, by the computer, the error message.

The source code can be written using a statically type checked programming language or a dynamically type checked programming language. In at least some embodiments of the invention, the error detected includes at least one of (i) a data type mismatch error, (ii) a syntax error, (iii) uninitialized variable access, or (iv) null value or pointer dereference.

In at least some embodiments of the invention, the error generating change includes at least one of (i) a change in a signature of a method in the source code, (ii) a change in a signature of a class in the source code, (iii) a change in data type of global variables in the source code, or (iv) a change in file containing the source code that may affect a dependency of the source code.

At least some embodiments of the invention may include (i) receiving, at a computer in a computer system, a notification of a change in source code of an application; (ii) determining, by the computer, whether the change in the source code satisfies a type check criteria; (iii) responsive to a determination that the change in the source code satisfies a type check criteria, determining, by the computer, a dependency of a portion of the source code which has changed, the dependency including at least a programming language construct of the source code that depends on the changed portion of the source code; (iv) performing, by the computer, an offline type check on the changed portion of the source code and the dependency of the changed portion of the source code, wherein the offline type check is performed without executing the source code; (v) determining, by the computer, whether the offline type check detected an error in (a) the changed portion of the source code and (b) the dependency of the changed portion of the source code; and (vi) responsive to a determination that the offline type check detected an error, generating, by the computer, an error message containing information on the error.

In at least some embodiments of the invention, the changed portion of source code includes at least one of (i) a class in the source code, (ii) a method in the source code, or (iii) a file containing the portion of the source code.

In at least some embodiments of the invention, determining the dependency of the changed portion of the source code includes (i) creating a graph of dependencies that indicates, for each of portions of the source code, the other portions of the source code used by each of the portions, (ii) inverting the graph of dependencies to obtain an inverted graph that indicates, for each of the portions of the source code, the other portions of the source code that are dependent on the each of the portions of the source code, and (iii) obtaining, from the inverted graph, the other portions of the source code that are dependent on the changed portion of the source code.

In at least some embodiments of the invention, performing the offline type check includes performing the offline type check based on a configurable level of type check. Performing the offline type check based on a configurable level of type check includes (i) determining if the configurable level of type check is at least one of (a) a file level type check, (b) a class level type check, or (c) a method level type check, (ii) responsive to a determination that the configurable level of type check is a file level type check, performing an offline type check on a dependency that is dependent on the file in which the portion of the source code is changed, (iii) responsive to a determination that the configurable level of type check is a class level type check, performing an offline type check on a dependency that is dependent on the class in which the portion of the source code is changed, and (iv) responsive to a determination that the configurable level of type check is a method level type check, performing an offline type check on a dependency that is dependent on the method in which the portion of the source code is changed.

Some embodiments of the invention have other aspects, elements, features, and steps in addition to or in place of what is described above. These potential additions and replacements are described throughout the rest of the specification.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Figure 1:
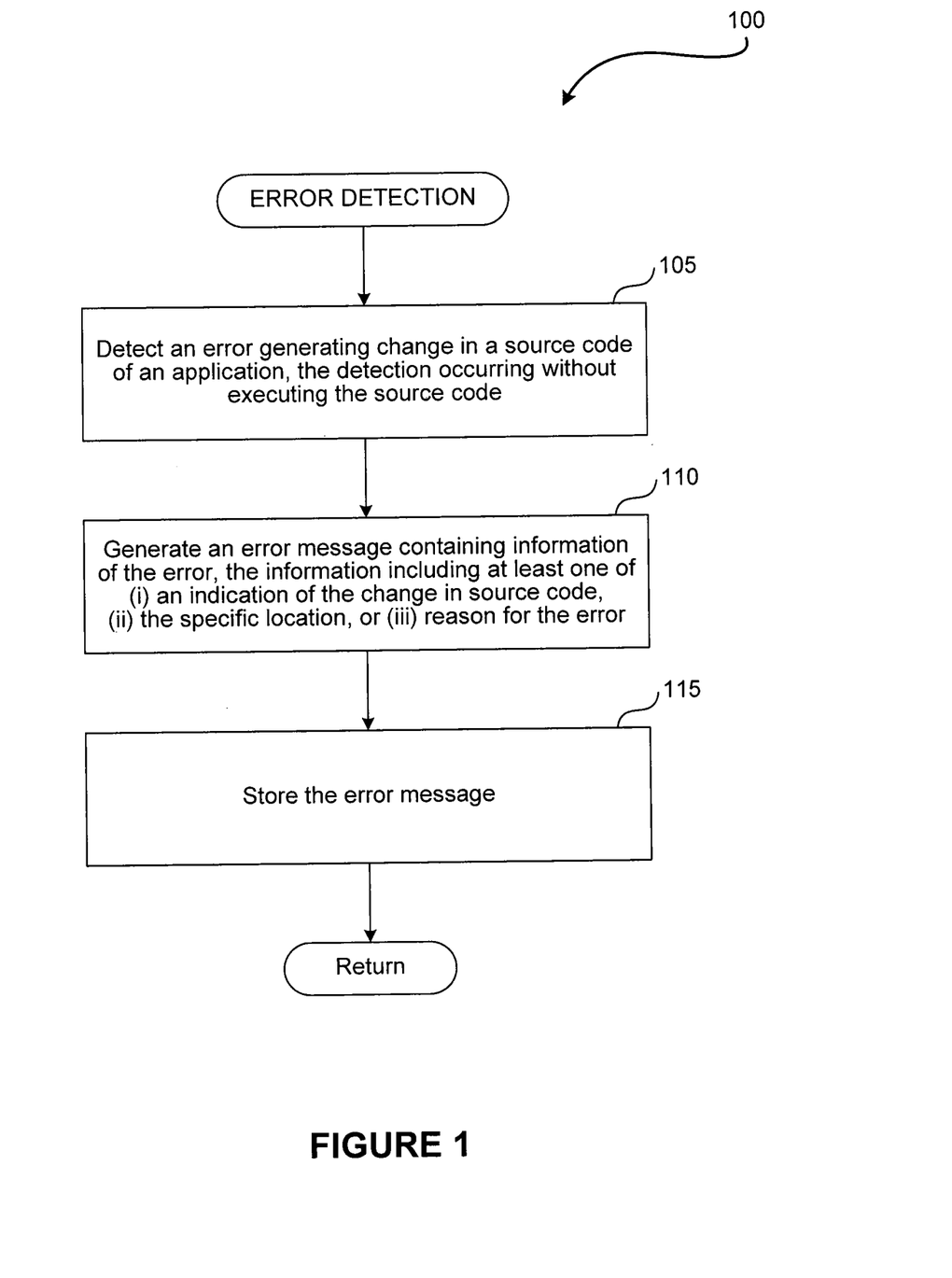
FIG. 1 is a flow diagram illustrating a process for detecting errors in source code of an application.

Disclosed is a method and system for detecting errors in a source code of an application without executing the source code. Such techniques provide an advantage of detecting the errors early on in the software development lifecycle and help in ensuring that code when executed, runs as expected without any errors. Further, such error detection techniques use the computing resources more efficiently compared to error detection processes that require an execution of the source code. Embodiments of the disclosed technique include detecting an error generating change at a specific location in source code of an application without executing the source code. After the error detection, an error message containing information of the error is generated and stored in a storage unit. The information on the error includes (a) an indication of the change in source code, (b) the specific location, or (c) reason for the error. The types of error detected can include (i) a data type mismatch error, (ii) a syntax error, (iii) uninitialized variable access, or (iv) null value or pointer dereference.
Exemplary Environment FIG. 1 is a flow diagram illustrating a process 100 for detecting errors in source code of an application, according to an embodiment of the disclosed technique. The source code of the application may be written using a statically type checked programming language or a dynamically type checked programming language. Typically, for source code written using dynamically type checked programming language, error detection cannot be performed without executing the source code. However, the disclosed techniques allow detection of errors in the source code written using dynamically type checked programming language without executing the source code.

At step 105, an error generating change at a specific location in the source code of the application is detected without executing the source code. In an embodiment, the source code of the application is written using a dynamically type checked programming language such as, for example, PHP: Hypertext Preprocessing (PHP).

At step 110, an error message containing information of the error is generated. In an embodiment, the error messages may be stored in a log, a server at which the error messages are generated, or other storage units. The error message contains information about the source of the error. The error message also includes (i) an indication of the change in source code, (ii) the specific location of the error, (iii) reason for the error, or (iv) a potential solution to resolve the error. The errors that can be detected include (i) a data type mismatch error, (ii) a syntax error, (iii) uninitialized variable access, or (iv) null value or pointer dereference. At step 115, the generated error message is stored.

Figure 2:
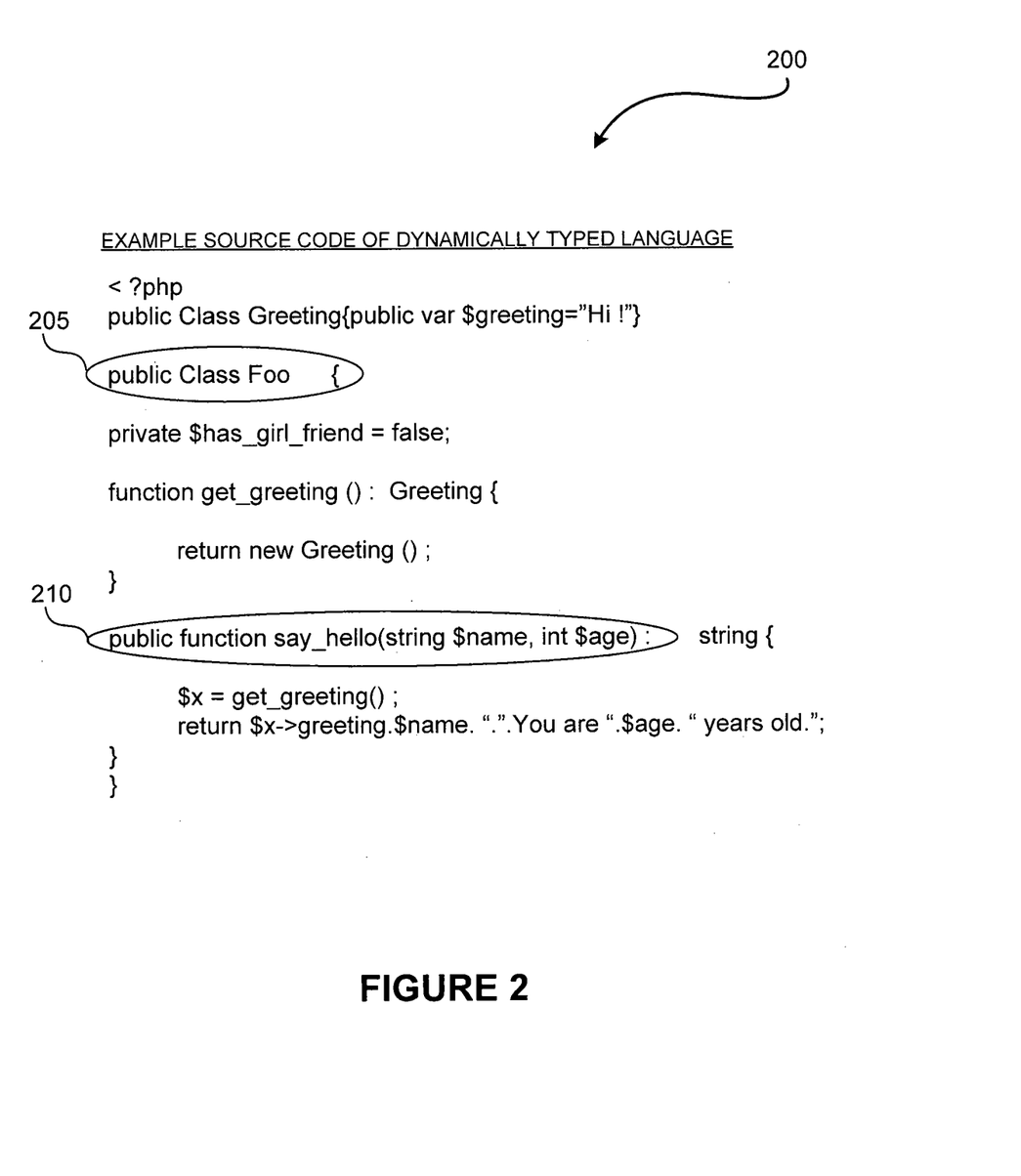
FIG. 2 illustrates an example source code written using a dynamically type checked programming language.

FIG. 2 illustrates an example source code 200 written using a dynamically type checked programming language, according to an embodiment of the disclosed technique. The source code 200 is written using a dynamically type checked programming language such as PHP. In other embodiments, the source code 200 may be written in statically type checked programming languages. The source code 200 may be written in a file that is stored in a storage unit of a computer system. The source code 200 includes programming language constructs such as a class 205, class attributes such as "private $has_girl_friend," one or more methods or functions such as function 210 associated with the class 205, and the file in which the source code 200 is written. In some embodiments, different programming languages may have different programming language constructs. For example, Java programming language has packages in addition to the above programming language constructs.

The function 210 generally defines a behavior of a class. The function 210 may be identified using a method signature. The signature of a method includes at least one of (i) a visibility scope of the method, (ii) a name of the method, (iii) number of parameters of the method, (iv) name of the parameters of the method, (v) a data type of the parameters of the method, (vi) order of the parameters of the method, or (vi) a data type of a return value of the method. For example, the signature of the function 210 is "public function say_hello (String, int): String," which implies that the name of the function 210 is "say_hello," the parameters of the function 210 are "String" and "int," and in that order, the return type of the method 210 is "String," and the visibility scope of the method is "public."

Similarly, the signature of the class 205 includes at least one of (i) a visibility scope of the class, (ii) a name of the class, (iii) signature of methods in the class, (iii) number of methods in the class, (iv) number of variables or constants in the class, (v) name of the variables or constants in the class, or (vi) a type of the variables or constants in the class. In the source code 200, the signature of the class 205 can include "Foo" which is the name of the class, "public" which is visibility scope of the class, and "Foo::get_greeting" is name of the method in the class 205.

In an embodiment, the signature of the programming language constructs can vary depending on the programming language in which the source code is written. For example, in some programming languages, a class may not have a visibility scope, and therefore, the class signature may not include a visibility scope.

Figure 3:
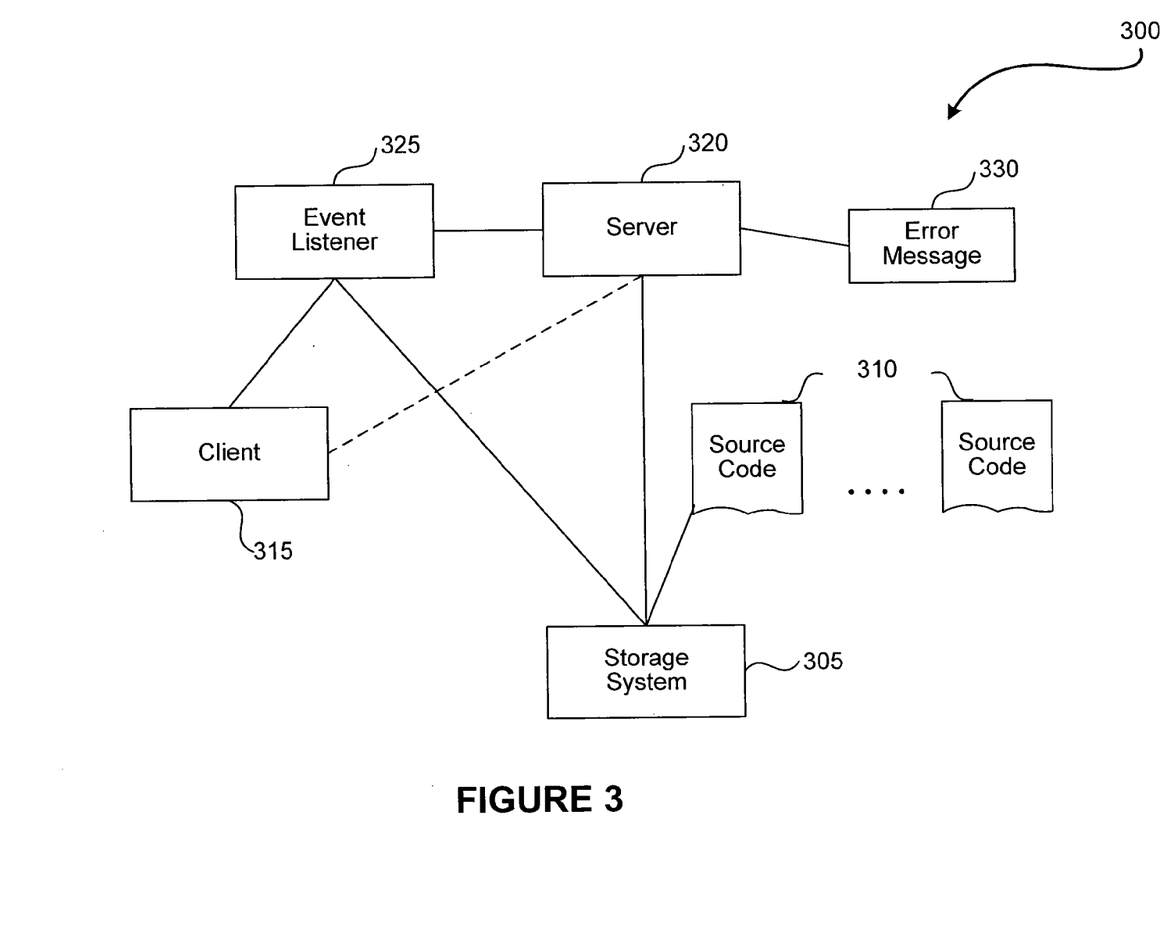
FIG. 3 is an environment including computer system 300 in which an embodiment of the invention can operate.

FIG. 3 is an environment including computer system 300 in which an embodiment of the invention can operate. As shown, the computer system 300 includes a storage system 305 that stores one or more files containing source code 310, a client 315 that performs an action on the source code 310, a server 320 that performs an error check on the source code 310, and an event listener 325 that listens for an event on the source code 310. The source code 310 can be similar to the source code 200 of FIG. 2. In another embodiment, the source code 310 can be different from the source code 200 or can be written using other dynamically type checked programming languages. The storage system 305 can be a database, a memory, or any other suitable storage devices in the computer system 300. The client 315, the server 320 and the event listener 325 may run on the same physical machine or different machines.

The client 315 can perform number of actions on the source code 310 including creating new code, editing existing source code, deleting existing source code, or changing a location (e.g. a directory) of the source code, etc. The event listener 325 listens for any of the user actions or events performed on the source code 310. In another embodiment, the client 315 can notify the event listener 325 of the event on the source code 310. The server 320 can request the event listener 325 to notify the server 320 of all or certain events that occur on the source code 310.

When the user performs an action on the source code 310 such as, for example, modifies source code 310, the event listener 325 notifies the server 320 that an event has occurred on the source code 310. The server 320 performs an error check on the source code 310 without executing the source code 310. The error check performed can include, for example, a type check process that checks for a data type mismatch error in the source code 310. The error check can also check for (i) syntax errors, (ii) uninitialized variable access, (iii) null value or pointer dereference, (iv) compile time errors, (v) semantic errors, etc. After completing the error check process, the server 320 generates an error message 330 containing information regarding the errors, and returns the error message to the client 315. Additionally or alternatively, the error message may be stored in a log file on the server 320, or storage system 305. The information generated in the error message can include (i) an indication of the change in source code, (ii) the specific location of the error, (iii) reason for the error, or (iv) a potential solution to resolve the error.

In order to perform the type check process effectively, the server 320 can perform a type check process on the changed portion of the source code 310 and the portions of the source code 310 that is dependent on the changed portion of the source code 310. By performing a type check process only on the changed portion of the source code 310 and the portions of the source code 310 that are dependent on the changed portion, instead of the whole of the source code 310, the type check process can be performed using relatively less computing resources. This technique results in a significant improvement in overall performance of the system 300, especially in a scenario where the source code has millions of lines of code or where the source code is modified frequently.

Figure 4:
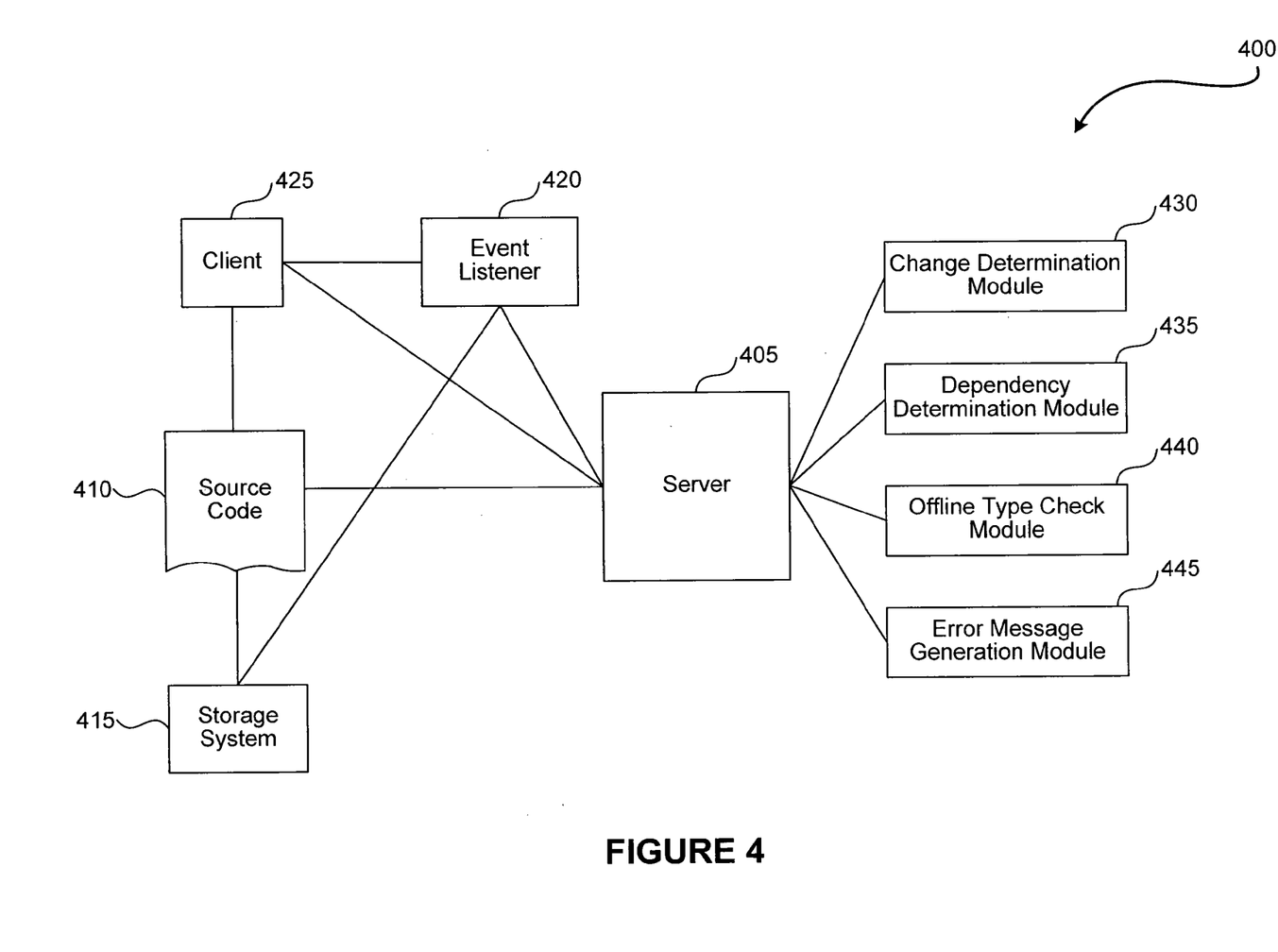
FIG. 4 is a block diagram illustrating a system for performing an offline type check on source code.

FIG. 4 is a block diagram illustrating a system 400 for performing an offline type check on source code, according to an embodiment of the disclosed technique. The system 400 may be similar to the system 300 of FIG. 3. The system 400 includes a server 405 that performs an offline type check on source code 410 stored in a storage system 415. The type check performed on the source code 410 is "offline" since the type check is performed without executing the source code 410. The source code 410 can be similar to the source code 200 of FIG. 2.

The event listener 420 listens for the events on the source code 410 and notifies the event to the server 405. The event may include any user action by, for example, client 425 that causes a change in the source code 410. The user action can include adding new code to the source code 410, deleting at least a portion of source code 410, modifying source code 410, or moving the source code 410 from one location to another.

When the server 405 receives notification of a change in the source code 410, a change determination module 430 working in cooperation with the server 405 determines whether the change is a potential error generating change. If the change determination module 430 determines that the change is a potential error generating change, the dependency determination module 435 working in cooperation with server 405 determines a dependency of the changed portion of the source code 410. The offline type check module 440 working in cooperation with the server 405 performs the type check on the changed portion of the source code 410 and on the dependencies of the changed portion of the source code 410. The offline type check module 440 performs the offline type check on the source code 410 without executing the source code 410. An error generation module 445 working in cooperation with the server 405 generates an error message containing any errors detected in the source code 410 and the dependencies of the source code 410.

The change determination module 430 determines that the change in the source code 410 is a potential error generating change based on criteria that includes at least one of (i) a change in a signature of a method in the source code, (ii) a change in a signature of a class in the source code, (iii) a change in data type of global variables or constants in the source code, or (iv) a change in file containing the source code that may affect a dependency of the source code.

The signature of the method includes at least one of (i) a visibility scope of the method, (ii) a name of the method, (iii) number of parameters of the method, (iii) a data type of the parameters of the method, (iv) order of the parameters of the method, or (v) a data type of a return value of the method. The signature of the class includes at least one of (i) a visibility scope of the class, (ii) a name of the class, (iii) number of methods in the class, (iv) number of variables in the class, (v) name of the variables or constants in the class, (vi) a type of the variables or constants in the class, or (vii) signature of methods in the class.

Consider the source code 200 of FIG. 2. In the source code 200, if, for example, the name of the method "get_greeting" is changed to, for example, "get_message,"

parameter(s) "(String: $name, int $age)" of the method "say_hello" is changed to "(String: $name)," or to "(int $age, String: $name),"

name of the class "Foo" is changed to, for example, "Fool," or visibility scope of the method "say_hello" is changed to "private" from "public," it may be determined that the change is a potential error generating change. Such changes are considered as potential error generating changes because portions of source code which depend on or use the above changed portion of the source code could be adversely affected by the change. For example, if the name of the method "get_greeting" is changed to "get_message," then this may result in an error since the method "say_hello" is calling the method "get_greeting."

However, certain changes may not be considered as potential error generating changes. For example, if a line of code "$x=007;" is added in the method "get_greeting," it is not considered as a potentially error generating change because the change does not affect other portions of the source code which depend on or use the method "get_greeting."

The dependency determination module 435 determines dependencies of the changed portion of the source code 410. The dependencies of a portion of a source code 410 may include other methods, classes or files in the application that may depend on or use the changed portion of the source code. For example, a method can depend on a class if the method is using an object of the class. A class can depend on another class (or an interface or a Trait) if the class is inheriting another class. The following paragraphs illustrate how the dependencies are determined.

Consider the following example source code which contains three different classes, namely, A, B and C. The classes A, B and C may be in the same file or separate files.

```
class A {
    function myMethod( ): B { return new B( ); }
    function lifeIsGood( ): { return "life is good";}
}
class B { }
class C {
    function foo(A $x): B { return $x->myMethod( ); }
    function howIsLife(A $x): String { return $x-> lifeIsGood( ); }
}
```

Assume that classes A and B are already defined in the source code and that the user modified the source code by adding new class C. The dependency determination module 435 examines the new lines, that is, class C, added to the source code. From examining "function foo(A $x): B," it is determined that "function foo" depends on classes A and B. From examining "return $x→myMethod( );" it is determined that "function foo" depends on myMethod of class A. From examining "function howIsLife(A $x): String," it is determined that "function howIsLife" depends on class A. From examining "return $x→lifeIsGood( )," it is determined that "function howIsLife" depends on function "lifeIsGood" of class A. Accordingly, the dependency determination module 435 creates a graph denoting the classes or methods on which the newly added lines of the source code depends. An example graph, for the newly added class C, may be denoted as follows:

(C::foo→A)
(C::foo→B)
(C::foo→A::myMethod)
(C::howIsLife→A)
(C::howIsLife→A:: lifeIsGood)

The dependency determination module 435 obtains dependencies for each portion of the source code by inverting the above graph. For example, the dependency graph of the source code is determined as:

(A→C:: foo, C::howIsLife)
(A::myMethod→C::foo)
(A:: lifeIsGood→C::howIsLife)
(B→C::foo)

The above dependency graph implies that class A has methods C::foo and C::howIsLife as its dependencies, function A::myMethod has function C::foo as its dependency, function A:: lifeIsGood has function C::howIsLife as its dependency, and class B has function C::foo as its dependency. The dependency graph may be stored in the server 405 or the storage system 415.

After the dependencies of the changed portion of the source code 410 are determined, the offline type check module 440 may perform the type check on the changed portion of the source code 410 and its dependencies. In the above example source code, consider a scenario where a user changes the name of the class A to "Apple." In order to ensure that the source code executes without any error, the offline type check module 440 has to ensure that the name of class A has been updated to the new name "Apple" wherever class A was used in the source code. Accordingly, the offline type check module 440 will have to perform a type check on class A and on the dependencies of class A. The offline type check module 440 determines, by referring to the dependency graph, that functions C::foo and C::howIsLife are the dependencies of class A and performs a type check on the determined dependencies.

In another scenario, if the user changes the return type of A::myMethod to "int," the offline type check module 440 determines that only method C::foo has to be type checked. If the method C::foo wasn't calling A::myMethod, then the method C::foo would not be type checked.

The offline type check process can be configured to perform type check at different type check levels. For example, the type check levels include (i) file level, (ii) class level, and (iii) method level. In the file level type check, the offline type checker performs a type check on dependencies that depend on or use a file which contains the changed portion of the source code. In the class level type check, the offline type checker performs a type check on dependencies that depend on or use a class which contains the changed portion of the source code. In the method level type check, the offline type checker performs a type check on dependencies that depend on or use a method which contains the changed portion of the source code.

In the above described example, consider a scenario where the user changes the return type of A::myMethod to "int." If the offline type check module 440 is configured to perform a type check at method level, then only method C::foo (which calls/uses A::myMethod that is changed by the user) is type checked. On the other hand, if the offline type check module 440 is configured to perform a type check at class level, then both methods C::foo and C::howIsLife are type checked (since both methods depend on or use class A which contains the changed A::myMethod).

Further, the levels of type check that can be performed in the source code can vary based on the programming language constructs of the source code and a hierarchy of the programming language constructs. A hierarchy of programming language constructs in the source code has an important role in determining the dependencies. The programming language constructs could be written in different hierarchies in the source code. The above illustrated hierarchy, namely, file→class→method, is just one example. Other hierarchy examples include file→package→class→method, file→namespace→class→method, or file→function. The hierarchy of programming language constructs can be different in different programming languages.

Further, the offline type check module 440 can be configured to perform a type check on user selectable lines of source code 410. The user can indicate the lines in the source code 410 to be ignored by the offline type check module 440 by, for example, marking the lines of source code 410 with a predefined sequence of characters. The offline type check module 440 will not consider the lines of the source code that has the predefined sequence of characters.

The error message generation module 445 generates an error message containing the errors determined by the offline type check module 440 in the source code 410. The error messages may be stored in various locations including the server 405, storage system 415 or client 425. The error message includes information on errors such as (i) location of the error, (ii) a reason for the error, or (iii) a potential solution to resolve the error.

Figure 5:
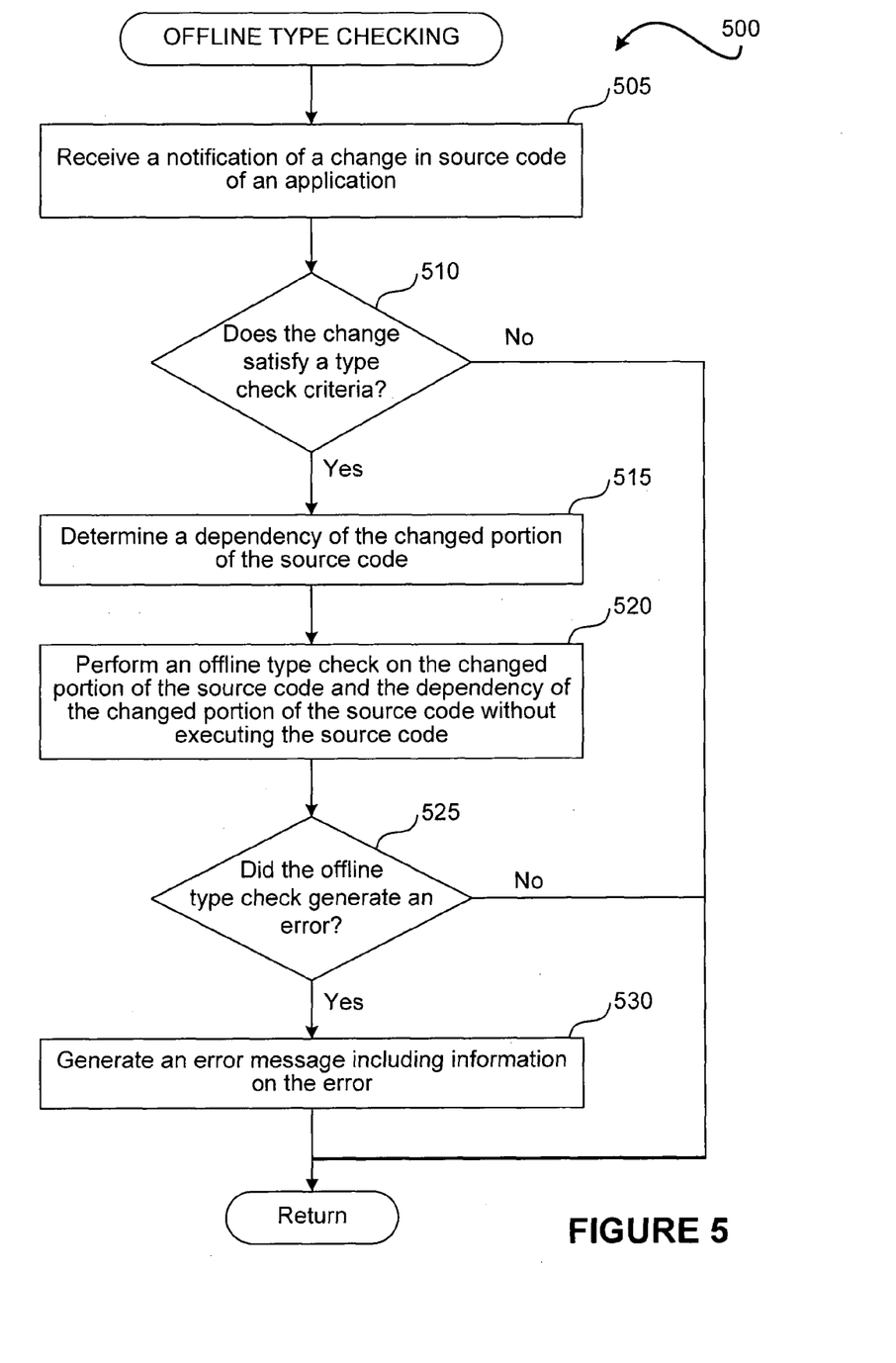
FIG. 5 is a flow diagram illustrating a process for performing an error check on source code.

Exemplary Methods for Performing an Offline Error Check in a Source Code of an Application FIG. 5 is a flow diagram illustrating a process 500 for performing an error check on source code, according to an embodiment of the disclosed technique. The process 500 can be executed in a system such as system 400 of FIG. 4. At step 505, a server receives a notification of a change in source code of an application. At determination step 510, the server (or a change determination module 430 of FIG. 4 working in cooperation with the server) determines whether the change in the source code satisfies a type check criteria. Responsive to a determination that the change in the source code does not satisfy a type check criteria, the process 500 returns.

On the other hand, responsive to a determination that the change in the source code satisfies a type check criteria, at step 515, the server (or a dependency determination module 435 of FIG. 4 working in cooperation with the server) determines a dependency of the portion of the source code which has changed. The dependency of the changed portion of the source code includes programming language constructs such as, for example, a file, a class, or a method that depends on the changed portion of the source code. At step 520, the server (or an offline type check module 440 of FIG. 4 working in cooperation with the server) performs an offline type check on the changed portion of the source code and the dependency of the changed portion of the source code. The server performs the offline type check without executing the source code.

Further, at determination step 525, the server (or an error generation module 445 of FIG. 4) determines whether the offline type check detected an error in (i) the changed portion of the source code or (ii) the dependency of the changed portion of the source code. Responsive to a determination that the offline type check did not detect an error, the process 500 returns. On the other hand, responsive to a determination that the offline type check detected an error, at step 530, the server (or the error message generation module 445) generates an error message containing information on the error. Further, the server may send the error message to a client which changed the source code. Additionally or alternatively, the error message may be stored in a log file on the server, or a storage system.

Examples of Operation

Figure 6:
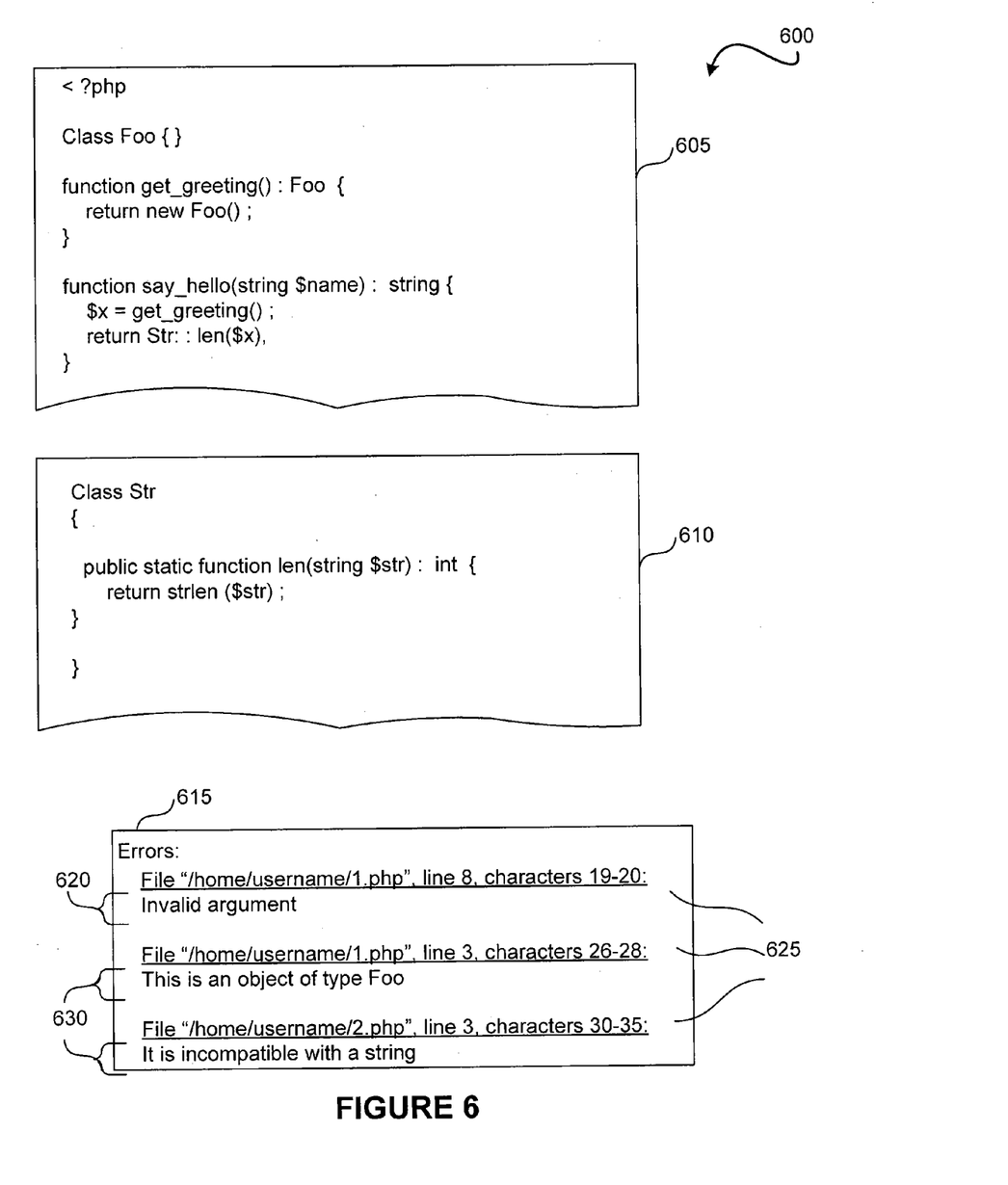
FIG. 6 provides an example error message generated by an offline type check process.

FIG. 6 provides an example error message generated by an offline type check process on source code 600, according to an embodiment of the disclosed technique. An error check may be performed on the source code 600 using a system such as system 400 of FIG. 4. A part of the source code 600, for example, class "Foo" and functions "get_greeting" and "say_hello" are written in file 605 and another part, for example, class "Str" is written in file 610. In another embodiment, the complete source code 600 may be written in a single file. When an error check is performed on the source code 600 using offline type checker such as, for example, offline type check module 440 of FIG. 4, an error message 615 is generated. The error message 615 contains information regarding the errors in the source code 600.

The function "Str::len($x)" in file 605 expects a string for variable "$x" (because the function len($x) as defined in class Str in file 610 receives a string), whereas "$x" is assigned an object of type "Foo." (See, line "$x=get_greeting( )" which returns an object of type "Foo" in file 605). The offline type checker detects an error in the above lines of code and accordingly, generates an error message 615 containing information regarding the above error.

For example, the error message 615 indicates that an error "Invalid argument" has occurred for variable "$x" at line having the code "return Str::len($x)" in the file 610. The error message 615 indicates that the reason for the "$x" to be an "Invalid argument" is that "This is an object of type Foo." Further, the error message 615 also indicates that "It [$x] is incompatible with a String" of the "function len (String $str)" defined in file 610. Thus, the error message 615 includes an indication of an error 620, a location of the error 625, and reason(s) for error 630. Accordingly, the error message 615 not only provides an indication of the error, it also provides, unlike prior error tracking systems, locations of the error and potential reasons for the error. The locations and the reasons for the error help the user in resolving the error.

In an embodiment, separate error logs may be generated for each of the files in the source code 600.

Example Apparatus

Figure 7:
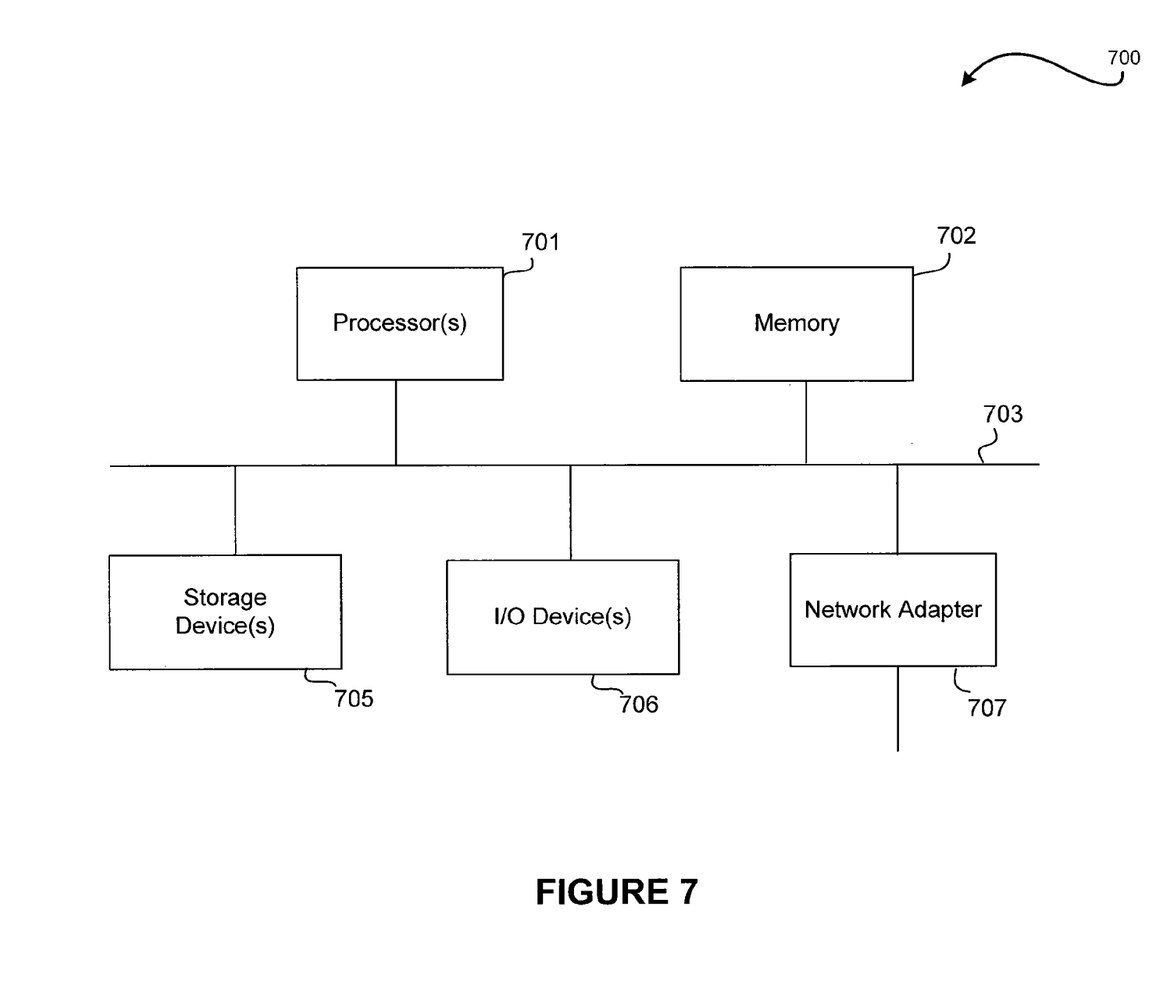
FIG. 7 is a block diagram of an exemplary apparatus that may perform various operations, and store various information generated and/or used by such operations.

FIG. 7 is a block diagram of an exemplary apparatus that may perform various operations, and store various information generated and/or used by such operations, according to an embodiment of the disclosed technique. The apparatus can represent any computer described herein. The computer 700 is intended to illustrate a hardware device on which any of the entities, components or services depicted in the examples of FIGS. 1-6 (and any other components described in this specification) can be implemented, such as a, a server, client, storage devices, databases, offline type checker module etc. The computer 700 includes one or more processors 701 and memory 702 coupled to an interconnect 703. The interconnect 703 is shown in FIG. 7 as an abstraction that represents any one or more separate physical buses, point to point connections, or both connected by appropriate bridges, adapters, or controllers. The interconnect 703, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 701 is/are the central processing unit (CPU) of the computer 700 and, thus, control the overall operation of the computer 700. In certain embodiments, the processor(s) 701 accomplish this by executing software or firmware stored in memory 702. The processor(s) 701 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 702 is or includes the main memory of the computer 700. The memory 702 represents any form of random access memory (RAM), read-only memory (ROM), flash memory, or the like, or a combination of such devices. In use, the memory 702 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 701 through the interconnect 703 are a network adapter 707, a storage device(s) 705 and I/O device(s) 706. The network adapter 707 provides the computer 700 with the ability to communicate with remote devices, over a network and may be, for example, an Ethernet adapter or Fibre Channel adapter. The network adapter 707 may also provide the computer 700 with the ability to communicate with other computers within the cluster. In some embodiments, the computer 700 may use more than one network adapter to deal with the communications within and outside of the cluster separately.

The I/O device(s) 706 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 702 can be implemented as software and/or firmware to program the processor(s) 701 to carry out actions described above. In certain embodiments, such software or firmware may be initially provided to the computer 700 by downloading it from a remote system through the computer 700 (e.g., via network adapter 707).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 705 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state The term "logic", as used herein, can include, for example, programmable circuitry programmed with specific software and/or firmware, special-purpose hardwired circuitry, or a combination thereof.

What is claimed is:

1. A method comprising:
   detecting, by a computer in a computer system, an error generating change at a specific location in source code of an application, the source code conforming to a dynamically typed programming language, the detecting including:
   detecting a change in a signature of a class or a method of the source code, and
   determining a dependency of a changed portion of the source code based on a type check level, the dependency including:
   in an event the type check level is a class level type check, a portion of the source code that is dependent on the class having the changed portion, and
   in an event the type check level is a method level type check, a portion of the source code that is dependent on the method having the changed portion;
   performing an offline type check on the changed portion of the source code and the dependency of the source code without executing the source code to identify an error, the error to be detected including a data type mismatch error;
   generating, by the computer, an error message containing information of the error, the information including at least one of (i) an indication of the change in source code, (ii) the specific location, or (iii) reason for the error; and
   storing, by the computer, the error message.

2. The method of claim 1, wherein the error to be detected further includes at least one of a syntax error, uninitialized variable access, or null value or pointer dereference.

3. The method of claim 1, wherein the error generating change further includes at least one a change in data type of global variables in the source code, or a change in file containing the source code which may affect a dependency of the source code.

4. A method comprising:
   receiving, at a computer in a computer system, a notification of a change in source code of an application, the source code conforming to a dynamically typed programming language;
   determining, by the computer, whether the change in the source code satisfies a type check criteria;
   responsive to a determination that the change in the source code satisfies a type check criteria, determining, by the computer, a dependency of a changed portion of the source code, the dependency including at least a programming language construct of the source code that depends on the changed portion of the source code, the dependency determined based on a class level type check or a method level type check;
   performing, by the computer, an offline type check on the changed portion of the source code and the dependency of the changed portion of the source code, wherein the offline type check is performed without executing the source code;
   determining, by the computer, whether the offline type check detected an error in at least one of (i) the changed portion of the source code, or (ii) the dependency of the changed portion of the source code, the error including a data type mismatch error in the source code; and
   responsive to a determination that the offline type check detected an error, generating, by the computer, an error message containing information on the error.

5. The method of claim 4, wherein the type check criteria includes at least one of (i) a change in a signature of a method in the source code, (ii) a change in a signature of a class in the source code, (iii) a change in data type of global variables in the source code, or (iv) a change in file containing the source code which may affect a dependency of the source code.

6. The method of claim 5, wherein the signature of the method includes at least one of (i) a visibility scope of the method, (ii) a name of the method, (iii) number of parameters of the method, (iii) a data type of the parameters of the method, (iv) order of the parameters of the method, or (v) a data type of a return value of the method, and
wherein the signature of the class includes at least one of (i) a visibility scope of the class, (ii) a name of the class, (iii) number of methods in the class, (iv) number of variables in the class, (v) name of the variables or constants in the class, (vi) a type of the variables or constants in the class, or (vii) signature of methods in the class.

7. The method of claim 4, wherein the changed portion of source code includes at least one of (i) a class in the source code, (ii) a method in the source code, or (iii) a file containing the changed portion of the source code.

8. The method of claim 7, wherein the programming language construct of the source code that depends on the changed portion of the source code includes at least one of (i) a file in the application, containing other portions of the source code, that depends on the changed portion of the source code, (ii) a class that is dependent on the changed portion of the source code, or (iii) a method that is dependent on the changed portion of the source code.

9. The method of claim 7, wherein determining the dependency of the changed portion of the source code includes:
creating a graph of dependencies that indicates a set of portions of the source code used by each of multiple portions of the source code,
inverting the graph of dependencies to obtain an inverted graph that indicates the portions of the source code that are dependent on each of the set of portions of the source code,
identifying one of the set of portions as the changed portion, and
obtaining, from the inverted graph, the portions of the source code that are dependent on the changed portion.

10. The method of claim 4, wherein performing the offline type check includes performing the offline type check based on the class level type check or the method level type check.

11. The method of claim 10, wherein performing the offline type check includes:
responsive to a determination that a level of type check to be performed is the class level type check, performing an offline type check on a dependency that is dependent on the class having the changed portion, and
responsive to a determination that the level of type check is the method level type check, performing an offline type check on a dependency that is dependent on the method having the changed portion.

12. The method of claim 4, wherein performing the offline type check includes performing offline type check on user selectable portions of the source code.

13. The method of claim 4, wherein the error detected by the offline type check further includes at least one of a syntax error, an uninitialized variable access, a null value, or a pointer dereference.

14. The method of claim 4, wherein the information on the error generated in the error message includes at least one of (i) location of the error, (ii) a reason for the error, or (iii) a potential solution to resolve the error.

15. The method of claim 4, wherein the programming language includes PHP (PHP: Hypertext Preprocessor) programming language.

16. An apparatus comprising:
a non-transitory storage device configured to store source code of an application, the source code conforming to a dynamically typed programming language;
an event listener configured to cooperate with a server to notify an occurrence of an event on the source code to the server, the event including user initiated change to the source code;
a change determination module configured to cooperate with the server to determine whether the change in the source code satisfies an error check criteria;
a dependency determination module configured to cooperate with the server to determine, responsive to a determination that the change in the source code satisfies the error check criteria, a dependency of a portion of the source code that has changed, the dependency including a programming language construct that depends on the changed portion of the source code;
an offline error check module configured to cooperate with the server to perform an offline error check on at least one of (i) the changed portion of the source code, or (ii) the dependency of the changed portion of the source code to determine an error, the error including a data type mismatch error, wherein the offline error check is performed without executing the source code; and
an error message generation module configured to cooperate with the offline error check module to generate an error message containing information on the error.

17. The apparatus of claim 16, wherein the error detected by the offline error check module further includes at least one of a syntax error, an uninitialized variable access, a null value, or a pointer dereference.

18. The apparatus of claim 16, wherein the error check criteria includes at least one of (i) a change in a signature of a method in the source code, (ii) a change in a signature of a class in the source code, (iii) a change in data type of global variables in the source code, or (iv) a change in file containing the source code that may affect a dependency of the source code.

19. The apparatus of claim 16, wherein the information on the error generated by the error message generation module includes at least one of (i) location of the error, (ii) a reason for the error, or (iii) a potential solution to resolve the error.

20. The apparatus of claim 16, wherein the offline error check module is further configured to perform the offline error check based on a configurable level of error check, the performing the offline error check based on the configurable level of error check including:
determining if the configurable level of error check is at least one of (i) a file level error check, (ii) a class level error check, or (iii) a method level error check,
responsive to a determination that the configurable level of error check is a file level error check, performing an offline error check on a dependency that is dependent on the file in which the portion of the source code is changed,
responsive to a determination that the configurable level of error check is a class level error check, performing an offline error check on a dependency that is dependent on the class in which the portion of the source code is changed, and
responsive to a determination that the configurable level of error check is a method level error check, performing an offline error check on a dependency that is dependent on the method in which the portion of the source code is changed.

21. An article of manufacture comprising:
a non-transitory computer-readable medium containing machine executable instructions which, when executed by a machine, cause the machine to execute a process including:
receiving, at a computer in a computer system, a notification of a change in source code of an application, the source code conforming to a dynamically typed programming language;
determining, by the computer, whether the change in the source code satisfies a type check criteria,
responsive to a determination that the change in the source code satisfies a type check criteria, determining, by the computer, a dependency of a changed portion of the source code, the dependency including a portion of the source code that depends on a class or a method of the source code having the changed portion of the source code,
performing, by the computer, an offline type check on the changed portion of the source code and the dependency of the changed portion of the source code, wherein the offline type check is performed without executing the source code,
determining, by the computer, whether the offline type check detected an error in at least one of (i) the changed portion of the source code or (ii) the dependency of the changed portion of the source code, the error to be detected including a data type mismatch error, and
responsive to a determination that the offline type check detected the error, generating, by the computer, an error message containing information on the error.

* * * * *